US008683460B2

(12) United States Patent
Eisenhauer et al.

(10) Patent No.: US 8,683,460 B2
(45) Date of Patent: Mar. 25, 2014

(54) GRANDFATHERING CONFIGURATIONS IN A DISTRIBUTED ENVIRONMENT

(75) Inventors: Daniel G. Eisenhauer, Austin, TX (US); Alexander David Hames, Austin, TX (US); David William Jeske, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 13/469,456

(22) Filed: May 11, 2012

(65) Prior Publication Data

US 2013/0305237 A1     Nov. 14, 2013

(51) Int. Cl.
*G06F 9/44* (2006.01)

(52) U.S. Cl.
USPC ........................................ 717/172

(58) Field of Classification Search
USPC ........................................ 717/172
See application file for complete search history.

(56) References Cited

U.S. PATENT DOCUMENTS

| 6,151,331 | A | 11/2000 | Wilson | 370/465 |
|---|---|---|---|---|
| 6,229,540 | B1 | 5/2001 | Tonelli et al. | 715/735 |
| 6,574,663 | B1 | 6/2003 | Bakshi et al. | 709/223 |
| 6,671,776 | B1 | 12/2003 | DeKoning | 711/114 |
| 6,832,247 | B1 | 12/2004 | Cochran et al. | 709/223 |
| 7,085,805 | B1 | 8/2006 | Ruberg et al. | 709/223 |
| 7,216,157 | B1 | 5/2007 | Liu et al. | 709/223 |
| 7,493,378 | B2 | 2/2009 | Kawashima | 709/223 |
| 7,869,382 | B2 | 1/2011 | Hamedi et al. | 370/254 |
| 2003/0208581 | A1 | 11/2003 | Behren et al. | 709/223 |
| 2005/0071385 | A1* | 3/2005 | Rao | 707/200 |
| 2007/0136098 | A1* | 6/2007 | Smythe et al. | 705/3 |
| 2008/0082636 | A1* | 4/2008 | Hofmann et al. | 709/220 |
| 2009/0132719 | A1* | 5/2009 | Havard | 709/230 |
| 2010/0313191 | A1* | 12/2010 | Yin et al. | 717/168 |
| 2012/0096190 | A1* | 4/2012 | Cardinell et al. | 710/16 |
| 2013/0138783 | A1* | 5/2013 | Mallur et al. | 709/221 |

FOREIGN PATENT DOCUMENTS

WO     WO 03/085543     10/2003     ............ G06F 15/173

* cited by examiner

*Primary Examiner* — Philip Wang
(74) *Attorney, Agent, or Firm* — VanLeeuwen & VanLeeuwen; Matthew W. Baca

(57) ABSTRACT

An approach is provided in which a distributed management appliance receives active device type identifiers from a computing system included in a distributed environment. The distributed management appliance identifies legacy device types from the active device type identifiers that fail to correspond to devices currently supported by the distributed management appliance. In turn, the distributed management appliance includes legacy device type identifiers and supported device type identifiers in a customized support matrix and distributes the customized support matrix to each of the computing systems included in the distributed environment.

24 Claims, 9 Drawing Sheets

GRANDFATHERING CONFIGURATIONS IN A DISTRIBUTED ENVIRONMENT

BACKGROUND

The present disclosure relates to supporting legacy devices installed on computing systems operating within a distributed environment.

A distributed computing environment is a software technology that manages computing and data exchange between computing systems, such as switches, servers, etc., included in a distributed network. Computing system manufactures provide system support (e.g., firmware updates) that supports various devices that a customer may wish to install in their computing system, such as pluggable interface cards, memory cards, etc. As hardware and software environments evolve and expand, computing system manufacturers may provide system support that focuses on newer technology installable devices.

BRIEF SUMMARY

According to one embodiment of the present disclosure, an approach is provided in which a distributed management appliance receives active device type identifiers from a computing system included in a distributed environment. The distributed management appliance identifies legacy device types from the active device type identifiers that fail to correspond to devices currently supported by the distributed management appliance. In turn, the distributed management appliance includes legacy device type identifiers and supported device type identifiers in a customized support matrix and distributes the customized support matrix to each of the computing systems included in the distributed environment.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
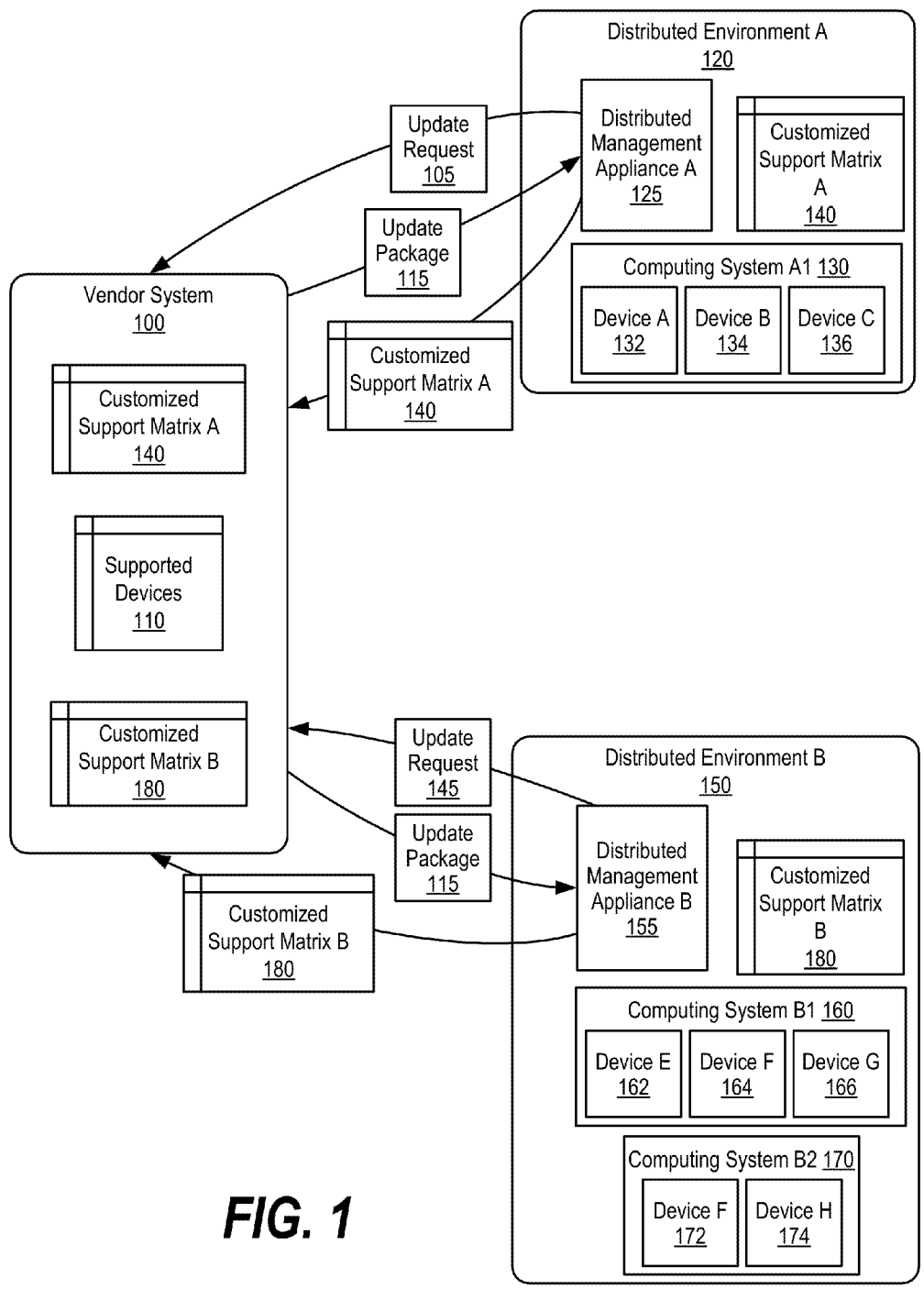
FIG. 1 is a diagram of a vendor system supporting legacy devices installed on customer systems.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram of a vendor system supporting legacy devices installed on customer systems. Vendor system 100 supports different computing system types and provides firmware updates as needed. In one embodiment, during the firmware update, vendor system 100 also provides a list of devices (e.g., default devices) that are currently supported by the vendor.

Vendor system 100 receives firmware update request 105 from distributed management appliance A 125. Distributed management appliance A 125 managed distributed environment A 120, which includes computer system A1 130. In one embodiment, distributed environment A 120 may include multiple computer systems that may or may not be heterogeneous computer systems.

Vendor system 100 receives update request 105 from distributed management appliance A 125 and determines that update request 105 corresponds to a particular computing system. For example, vendor system 100 may manufacture computing switches, in which case vendor system 100 may identify a particular switch model or family that corresponds to update request 105.

Vendor system 100 includes supported devices 110, which includes a list of supported device type identifiers for the particular computing system corresponding to update request 105. As such, vendor system 100 includes the supported device type identifiers and updated firmware in update package 115, and sends update package 115 to distributed management appliance A 125.

Distributed management appliance A 125 extracts the supported device type identifiers from update package 115, and queries computing system A1 130 for a list of its active devices. In turn, computing system A1 130 includes active device type identifiers corresponding to devices 132, 134, and 136 and sends the active device type identifiers to distributed management appliance A 125.

Distributed management appliance A 125 compares the received active device type identifiers to the supported device type identifiers in order to identify legacy devices actively utilized by distributed environment A 120. As such, distributed management appliance A 125 creates customized support matrix A 140, which includes legacy device type identifiers and the supported device type identifiers (see FIG. 5 and corresponding text for further details). In turn, distributed management appliance A 125 sends customized support matrix A 140 to each corresponding computing system included in distributed environment A 120.

In order for vendor system 100 to track and support legacy devices, distributed management appliance A 125 sends customized support matrix A 140 to vendor system 100. As such, vendor system 100 accesses customized support matrix A 140 to determine supportability when it receives requests from distributed management appliance A 125 and/or computing systems included in distributed environment A 120 (see FIG. 6 and corresponding text for further details).

In one embodiment, vendor system 100 stores a customized support matrix for each supported customer. When vendor system 100 receives update request 145 from distributed management appliance B 155, vendor system 100 provides update package 115 to distributed management appliance B 155, which includes the supported device type identifiers and the firmware update. Distributed management appliance B 155 extracts the supported device type identifiers from update package 115, and queries computing systems B1 160 and B2 170 for a list of active devices. Computing system B1 160 provides active device type identifiers for devices 162, 162, and 166, and computing system B2 170 provides active device type identifiers for devices 172 and 174.

Distributed management appliance B 155 identifies legacy devices installed on computer system B1 160 and/or computer system B2 170 that do not correspond to one of the supported device type identifiers. As such, distributed management appliance B 155 creates customized support matrix B 180, which includes legacy device type identifiers as well as the supported device type identifiers. In turn, distributed management appliance B 155 sends customized support matrix B 140 to each corresponding computing system included in distributed environment B 150 (e.g., computer system B1 160 and computing system B2 170). As a result, each computing system within distributed environment B 150 is able to support each legacy device, such as swapping a legacy device between computing systems.

Figure 6:
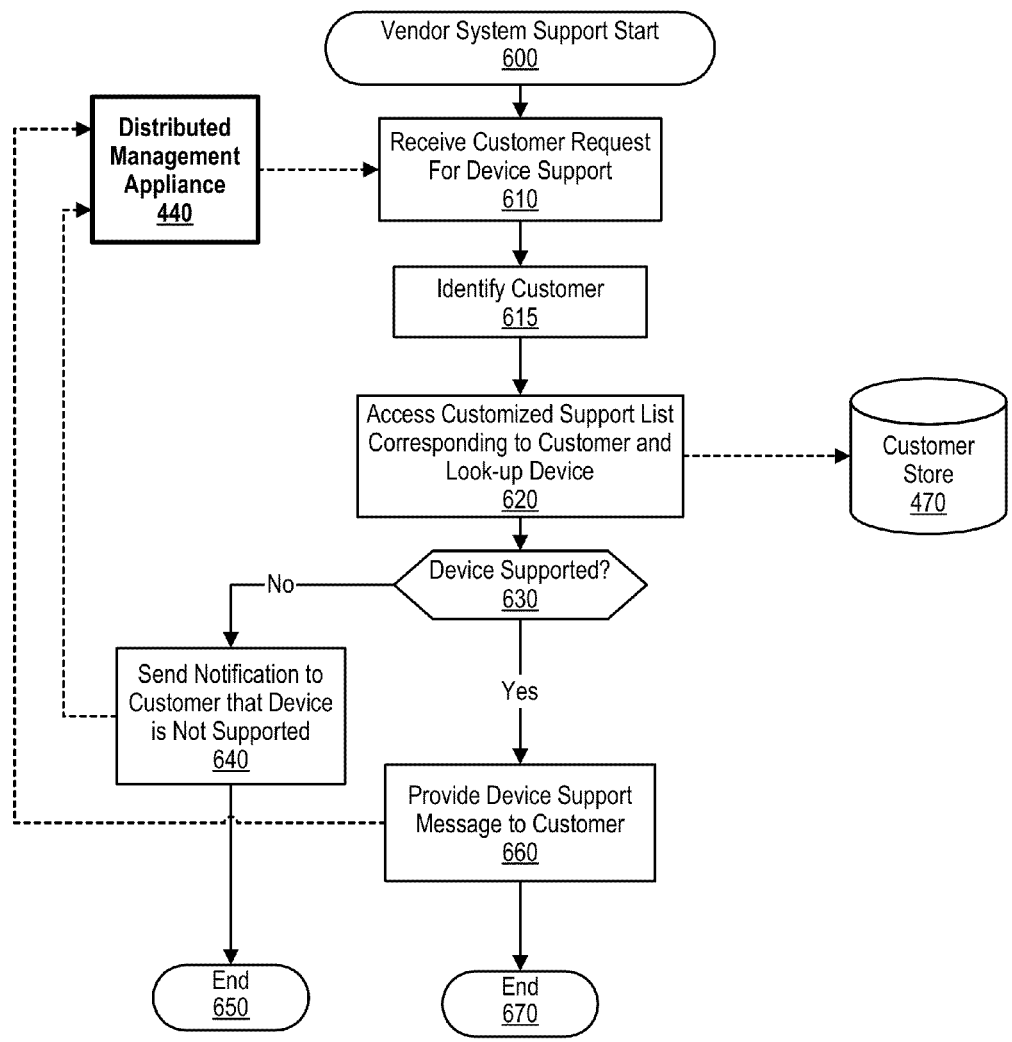
FIG. 6 is a flowchart showing steps taken in a vendor system supporting legacy devices installed on a consumer system.

In addition, in order for vendor system 100 to provide customized support for customer B's distributed environment 150, distributed management appliance B 150 sends customized support matrix B 180 to vendor system 100 (see FIG. 6 and corresponding text for further details).

Figure 2:
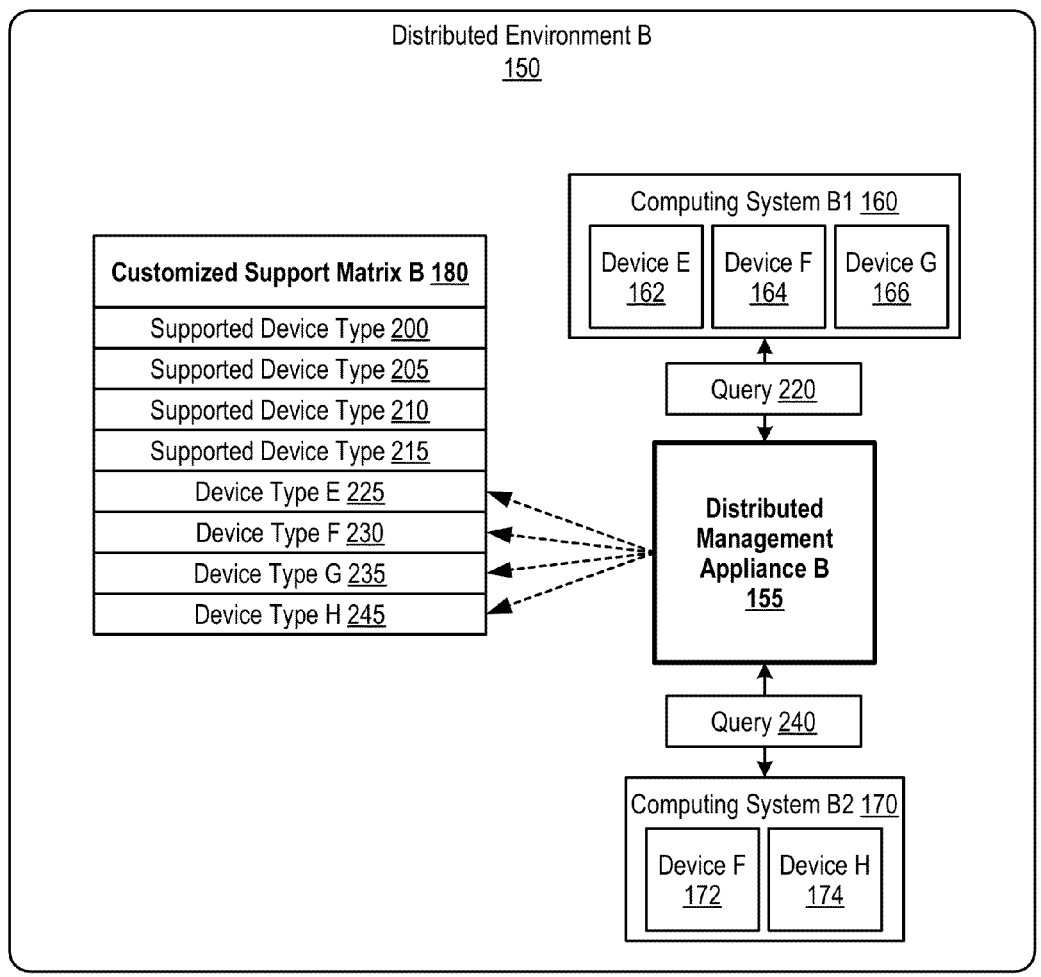
FIG. 2 is a diagram showing a distributed management appliance querying different computing systems residing within a distributed environment for a list of their corresponding active devices.

FIG. 2 is a diagram showing a distributed management appliance querying different computing systems residing within a distributed environment for a list of their corresponding active devices. Distributed management appliance B 155 sends query 220 to computing system B1 160 and receives a list of active devices from computing system B1 160, which identifies devices 162, 164, and 166. In one embodiment, devices 162-166 are pluggable devices. Likewise, distributed management appliance B 155 sends query 240 to computing system B1 160 and receives a list of active devices, which identifies devices 172 and 174.

Distributed management appliance B 155 creates customized support matrix B 180, which includes supported device types 200, 205, 210, and 215. Supported device types 200-215, in one embodiment, are included in a firmware update package supplied to distributed management appliance 155 by a vendor system. Distributed management appliance B 155 includes device types E 225, F 230, and G 235, which corresponds to computing system B1 160's devices 162-164, in customized support matrix B 180. And, in order for customized support matrix B 180 to be a distributed environment-wide support matrix, distributed management appliance B 155 includes device type H 174, which corresponds to computing system B2 170's device 174, in customized support matrix B 180.

Figure 3A:
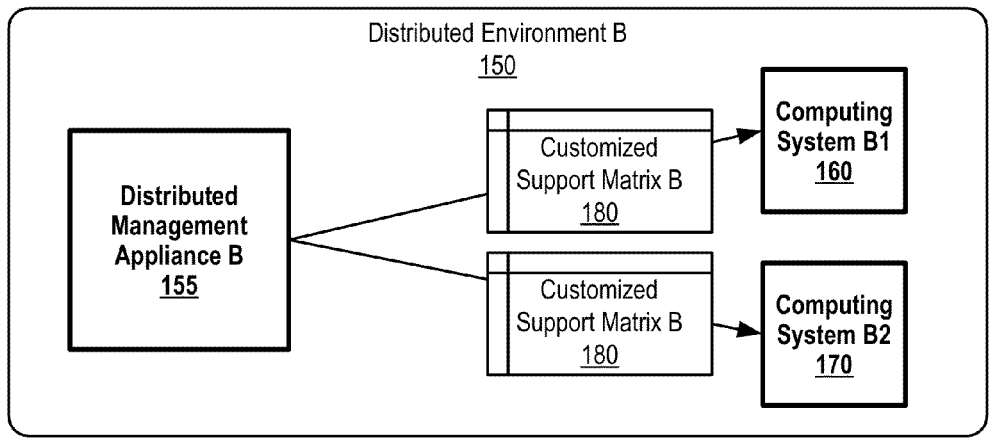
FIG. 3A is a diagram showing a distributed management appliance providing a customized support matrix to each corresponding computing system included in a distributed environment.

FIG. 3A is a diagram showing a distributed management appliance providing a customized support matrix to each corresponding computing system included in a distributed environment. Distributed management appliance B 155 identifies computing systems within distributed environment B 150 that match a recently generated or updated support matrix. In one embodiment, distributed environment B 150 may include different switches from different vendors and, in this embodiment, distributed management appliance B 155 identifies the particular switches that correspond to the recently generated or updated support matrix.

The example in FIG. 3A shows that distributed management appliance B 155 provides customized support matrix B 180 to computing system B1 160 and B2 170. As such, a customer may swap devices between the computing systems and/or add new devices to either one of the computing systems that is included in customized support matrix B 180 (see FIG. 3B and corresponding text for further details).

Figure 3B:
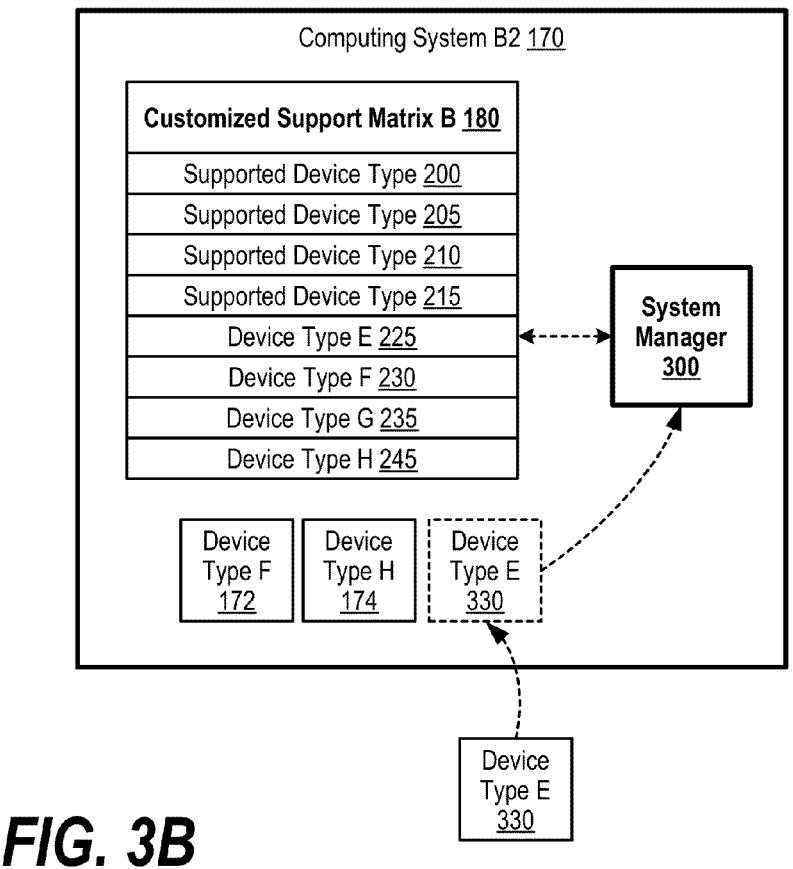
FIG. 3B is a diagram showing a computing system detecting a new device installation and verifying support for the device.

FIG. 3B is a diagram showing a computing system detecting a new device installation and verifying support for the device. Computing system B2 170 includes system manager 300, customized support matrix B 180, and devices 172-174. As discussed previously, customized support matrix B 180 is a disturbed environment-wide list of device types, which includes legacy device types that identifies active devices installed on each computing system within the distributed environment.

System manager 300 detects installation of device E 330, which is a different device type than devices currently installed in computing system B2 170. However, since customized support matrix B 180 includes a legacy device type entry corresponding to device E 330 (device type E 330), system manager 300 configures device E 330 accordingly.

Figure 4:
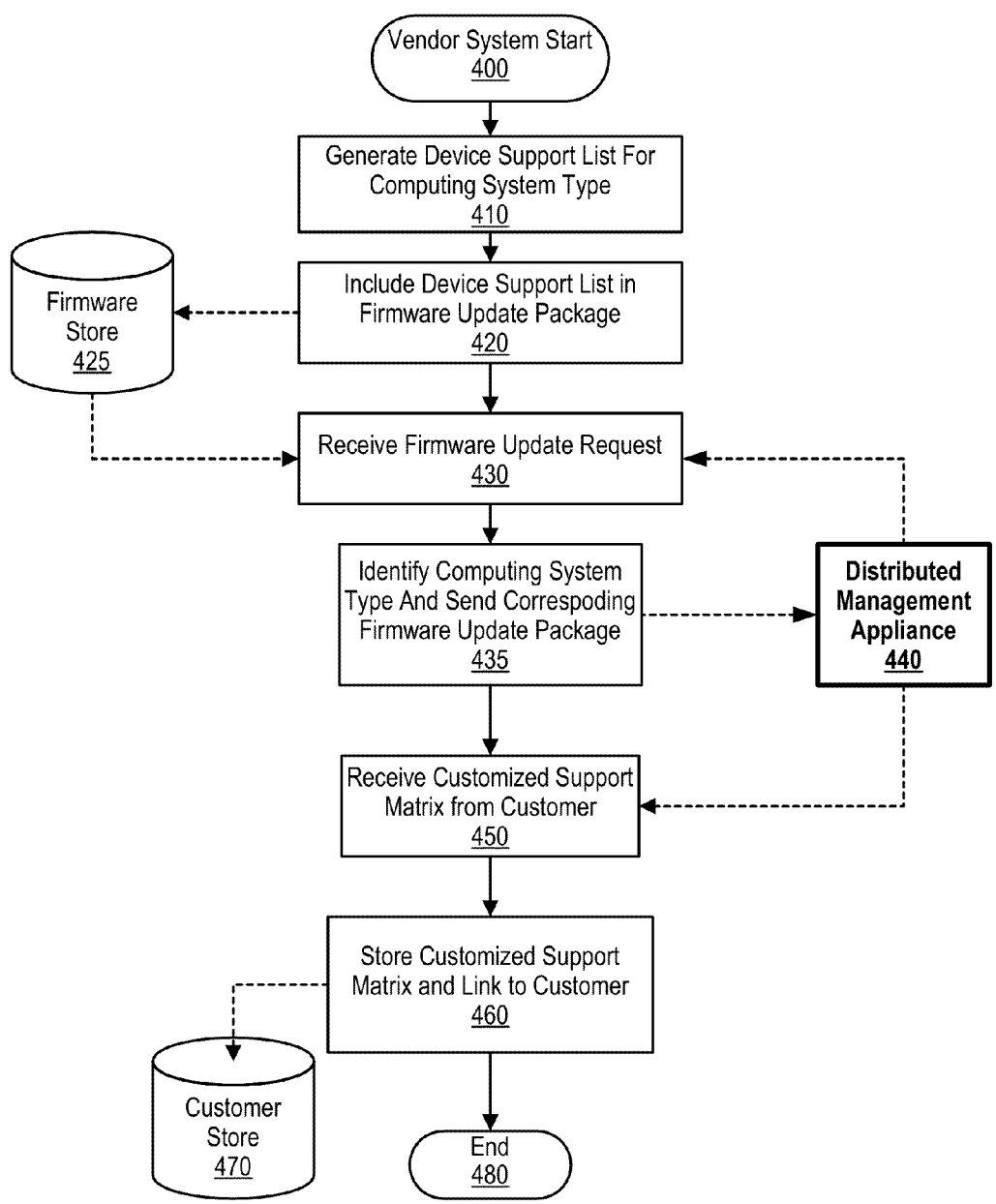
FIG. 4 is a flowchart showing steps taken in a vendor system sending a firmware update package to a customer system and receiving a customized support matrix from the customer system.

FIG. 4 is a flowchart showing steps taken in a vendor system sending a firmware update package to a customer system and receiving a customized support matrix from the customer system. Vendor processing commences at 400, whereupon the vendor system generates a device support list for a particular computing system type or family, which includes supported device types of devices supported by the vendor. At step 420, processing includes the device support list in a firmware update package.

Next, at step 430, the vendor system receives an update request from distributed management appliance 440. The vendor system identifies a computing system type corresponding to the update request and sends the firmware update package to distributed management appliance 440 (step 435). Distributed management appliance 440 analyzes its distributed environment and creates a customized support matrix, which includes legacy device types utilized in the distributed environment (see FIG. 5 and corresponding text for further details).

The vendor system receives the customized support matrix at step 450. At step 460, the vendor system stores the customized support matrix in customer store 470 and links the customized support matrix to distributed management appliance 440. In turn, the vendor system may access the customized support matrix to support distributed management appliance 440's computing systems (see FIG. 6 and corresponding text for further details). Processing ends at 480.

Figure 5:
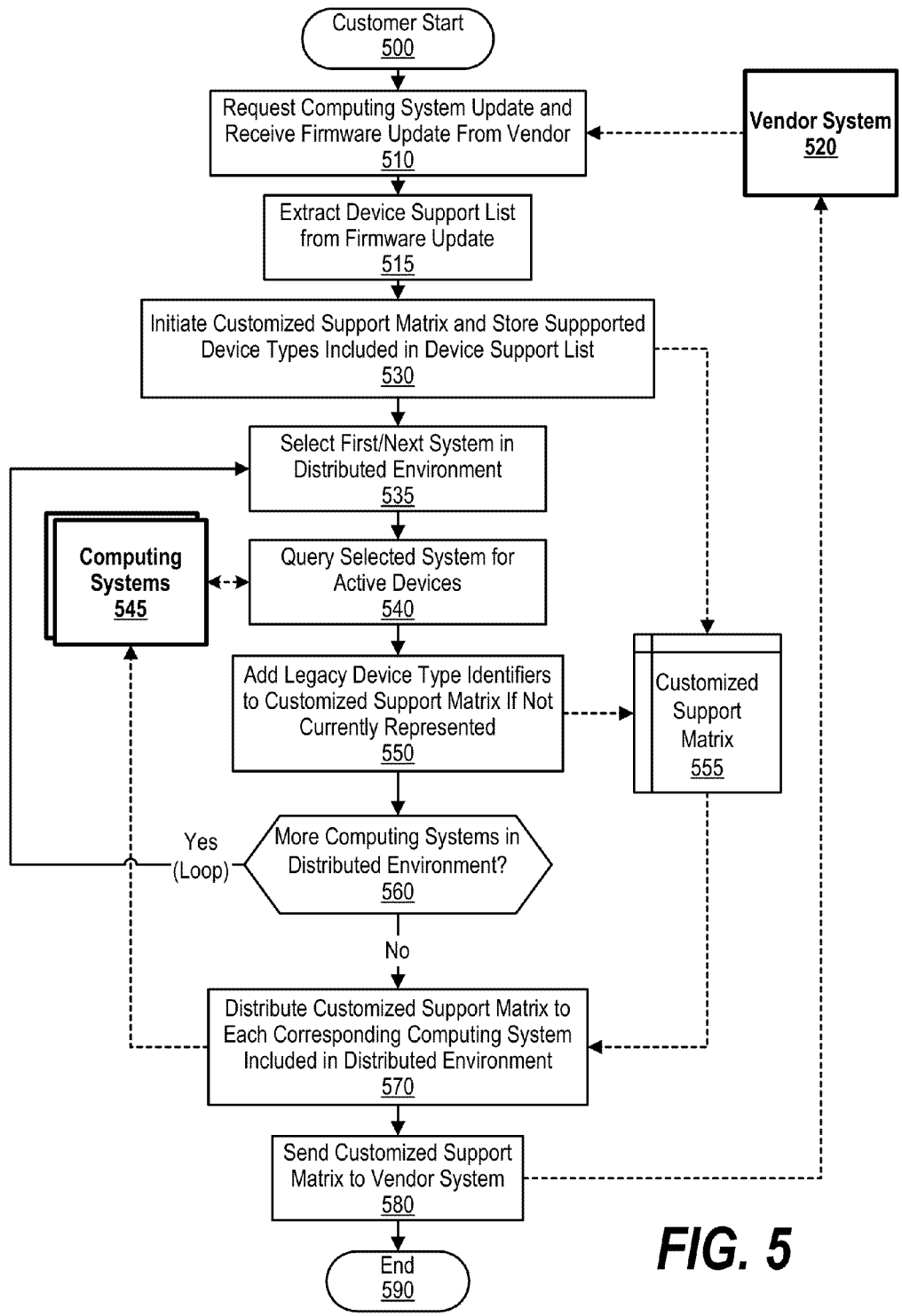
FIG. 5 is a flowchart showing steps taken in a customer's distributed management appliance generating a customized support matrix.

FIG. 5 is a flowchart showing steps taken in a customer's distributed management appliance generating a customized support matrix. Processing commences at 500, whereupon the distributed management appliance requests/receives a firmware update package from vendor system 520 at step 510. At step 530, the distributed management appliance extracts a device support list, which includes supported device type identifiers, from the firmware update package.

At step 530, the distributed management appliance initiates customized support matrix 555 and stores the supported device type identifiers in customized support matrix 555. In one embodiment that includes an existing customized support matrix corresponding to the same computing system type, the distributed management appliance may update the existing customized support matrix with the supported device type identifiers.

Next, at step 535, the distributed management appliance selects a first computing system from computing systems 545 included in the customer's distributed environment and, at step 540, queries the selected computing system for active devices. The distributed management appliance receives a response from the selected system and adds device identifiers (legacy device identifiers) included in the response that are not currently supported in customized support matrix 555. For example, the selected system may include an active device XYZ, which is not a default device supported by vendor system 520. In this example, the distributed management appliance adds legacy device XYZ identifier to customized support list 555.

A determination is made as to whether there are more computing systems 545 to query (decision 560). If there are more systems to query, decision 560 branches to the "Yes" branch, which loops back to select and query the next computing system. This looping continues until there are no more computing systems to query, at which point decision 560 branches to the "No" branch. At this point, customized support list 555 includes legacy device type identifiers that identify each active legacy devices included in one or more of computing systems 545.

The distributed management appliance distributes customized support matrix 555 to each of computing systems 545 at step 570. As such, a legacy device may be swapped between computing systems 545 without configuration issues (see FIG. 7 and corresponding text for further details). At step 580, the distributed management appliance sends customized support matrix 555 to vendor system 520, which vendor system 520 accesses when device support issues arise from computing systems 545. Processing ends at 590.

FIG. 6 is a flowchart showing steps taken in a vendor system supporting legacy devices installed on a consumer system. Vendor support processing commences at 600, whereupon the vendor system receives a customer request from distributed management appliance 440 at step 610. In one embodiment, the vendor system may receive a request from a computing system (e.g., switch) residing in a distributed environment managed by distributed management appliance 440.

At step 615, the vendor system identifies the customer and, at s620, the vendor system access customer store 470 to analyze a customized support matrix corresponding to the customer. A determination is made as to whether the device type corresponding to the customer request is included in the customer's customized support matrix (decision 630). If the device type is included, decision 630 branches to the "Yes" branch, whereupon the vendor system provides a device support message to distributed management appliance 440 at step 660, (e.g., software fixes, troubleshoot information, etc.). Processing ends at 670.

On the other hand, if the device type is not included in the customer's customized support matrix, decision 630 branches to the "No" branch, whereupon the vendor system sends a notification to distributed management appliance 440 that the particular device is not supported, and processing ends at 650.

Figure 7:
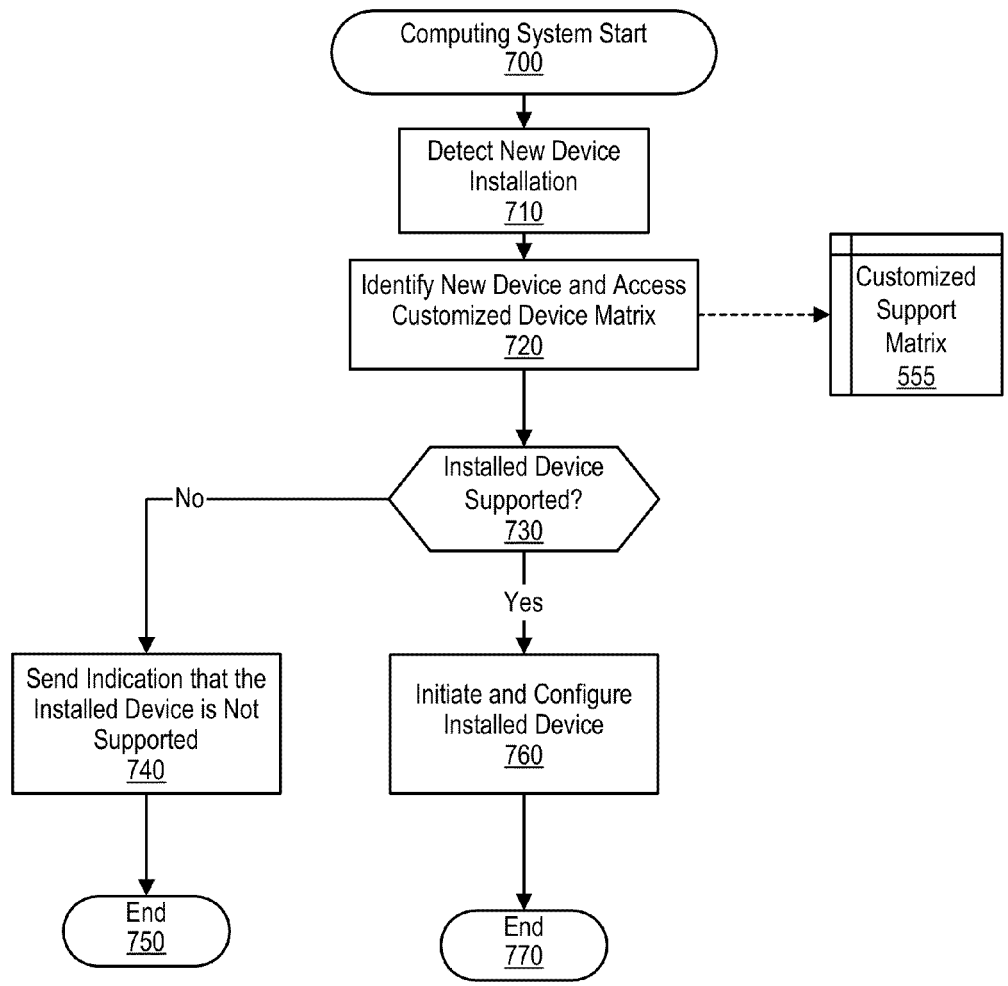
FIG. 7 is a flowchart showing steps taken in a computing system detecting and configuring a pluggable device.

FIG. 7 is a flowchart showing steps taken in a computing system detecting and configuring a pluggable device. In one embodiment, the computing system is part of a distributed environment that includes multiple computing systems. In this embodiment, each computing system locally stores a customized support matrix that each computing system utilizes to configure installed devices.

Processing commences at 700, whereupon processing detects a new device installation at step 710. At step 720, the computing system identifies the device and accesses customized support matrix 555 to look-up a device identifier that corresponds to the installed device (e.g., legacy device type identifier or supported device type identifier).

A determination is made in response to accessing customized support matrix 555 as to whether the installed device is supported (decision 730). If the device is supported, decision 730 branches to the "Yes" branch, wherein the computing system configures the installed device accordingly at step 760. Processing ends at 770.

On the other hand, if the device is not supported, decision 730 branches to the "No" branch, whereupon the computing system provides an indication (e.g., error message) that the installed device is not supported by the computing system. Processing ends at 740.

Figure 8:
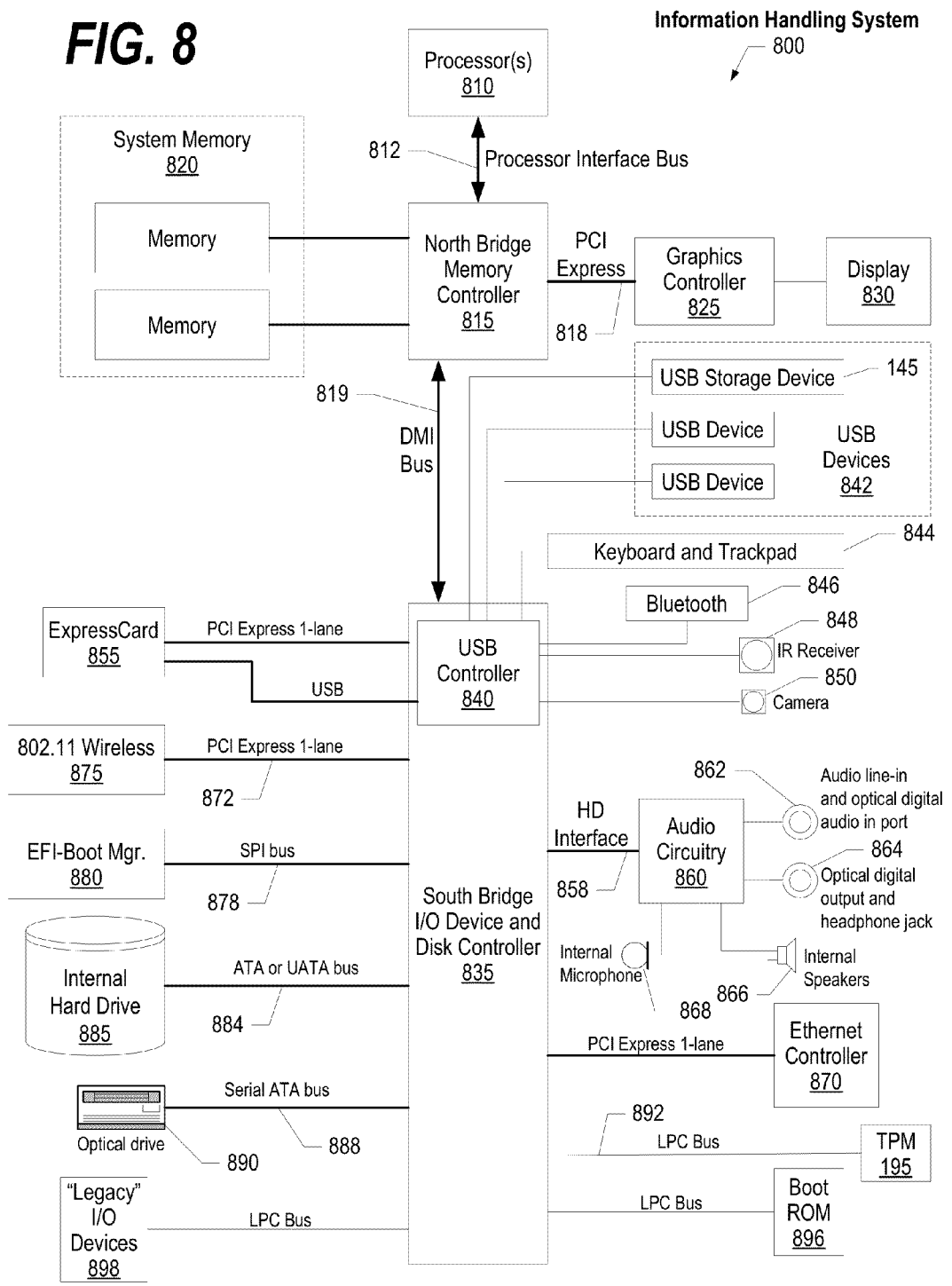
FIG. 8 is a block diagram of a data processing system in which the methods described herein can be implemented.

FIG. 8 illustrates information handling system 800, which is a simplified example of a computer system capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 895) shown in FIG. 8 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 9.

Figure 9:
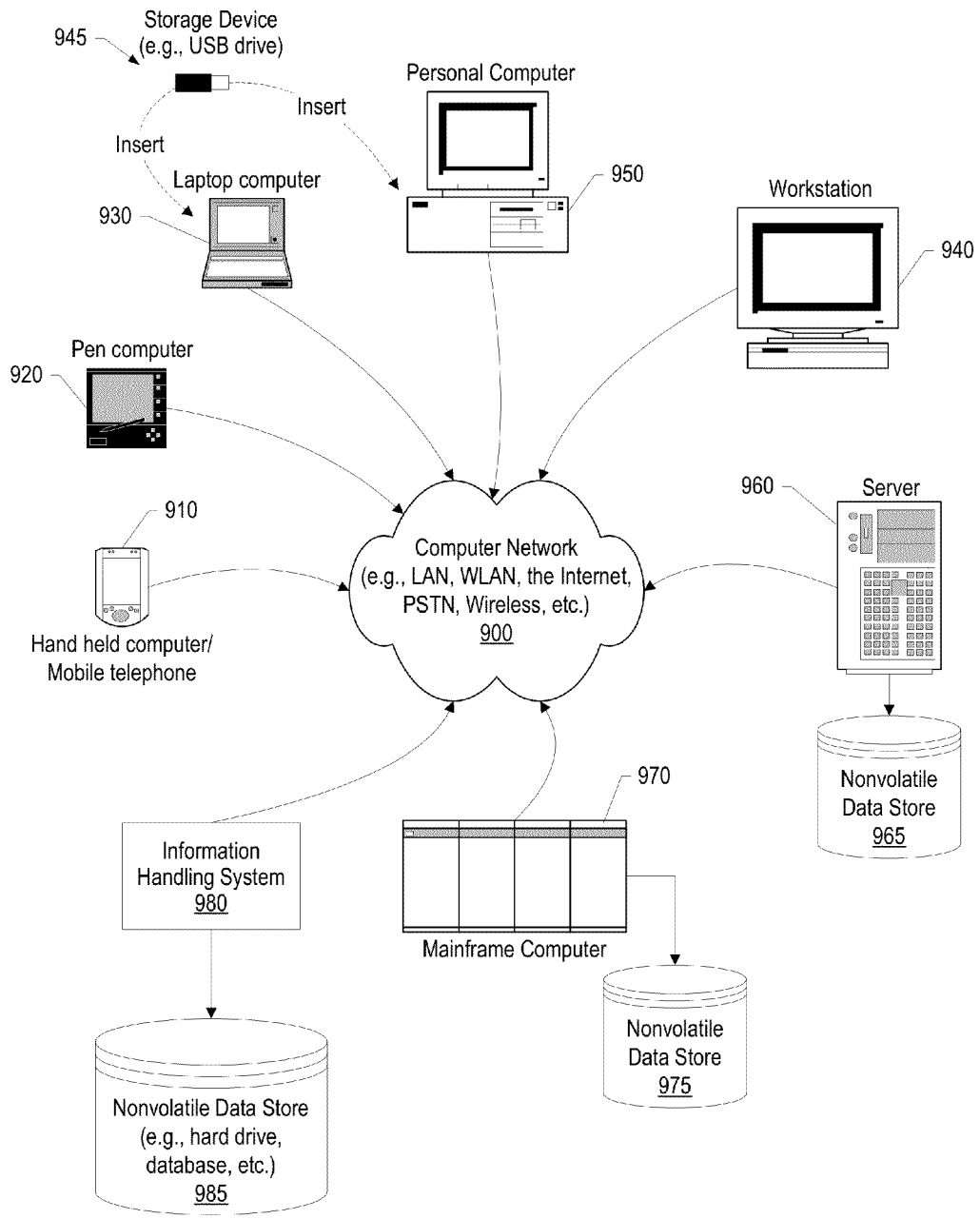
FIG. 9 provides an extension of the information handling system environment shown in FIG. 8 to illustrate that the methods described herein can be performed on a wide variety of information handling systems which operate in a networked environment.

FIG. 9 provides an extension of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
    receiving, at a distributed management appliance from a first one of a plurality of computing systems included in a distributed environment, one or more active device type identifiers that identify one or more active devices installed on the first computing system;
    identifying one or more legacy device type identifiers, included in the one or more active device type identifiers, that fail to correspond to one of a plurality of supported device type identifiers, the plurality of supported device type identifiers corresponding to a plurality of device types supported by the distributed management appliance;
    including the one or more legacy device type identifiers and the plurality of supported device type identifiers in a customized support matrix; and
    distributing, by the distributed management appliance, the customized support matrix to each of the plurality of computing systems included in the distributed environment.

2. The method of claim 1 wherein each of the plurality of computing systems corresponds to a computing system type, the method further comprising:
    sending a firmware update request corresponding to the computing system type from the distributed management appliance to a vendor system;

receiving a firmware update package at the distributed management appliance in response to the firmware update request;

extracting the plurality of supported device type identifiers from the firmware update package; and storing the plurality of supported device type identifiers at the distributed management appliance.

3. The method of claim 2 further comprising:

sending, by the distributed management appliance, the customized support matrix to the vendor system;

sending a support request to the vendor system that includes one of the legacy device types; and receiving a support message from the vendor system in response to the vendor system determining that the included legacy device type is included in the customized support matrix.

4. The method of claim 3 wherein the support request includes a customer identifier that corresponds to the distributed management appliance, the vendor system utilizing the customer identifier to select the customized support matrix from a plurality of customized support matrices located at the vendor system.

5. The method of claim 4 wherein one of the plurality of customized support matrices located at the vendor system fails to include the one or more legacy device type identifiers.

6. The method of claim 1 further comprising:

receiving, at the distributed management appliance from a second one of the plurality of computing systems, one or more different active device type identifiers that identify one or more different devices installed in the second computing system;

identifying one or more different legacy device type identifiers, included in the one or more active device type identifiers, that fail to be included in the customized support matrix; and including the one or more different legacy device type identifiers in the customized support matrix prior to the distributing of the customized device support matrix.

7. The method of claim 6 further comprising:

detecting, at the second computer system, installation of a pluggable device;

determining, by the second computer system, that the installed pluggable device corresponds to one of the legacy device type identifiers included in the customized support matrix; and configuring, by the second computer system, the installed pluggable device in response to the determination.

8. The method of claim 1 wherein, in response to the distribution, each of the plurality of computing systems included in the distributed environment is adapted to independently configure one or more legacy devices corresponding to the one more legacy device types.

9. An information handling system comprising:

one or more processors;

a memory coupled to at least one of the processors;

a set of computer program instructions stored in the memory and executed by at least one of the processors in order to perform actions of:

receiving, at a distributed management appliance from a first one of a plurality of computing systems included in a distributed environment, one or more active device type identifiers that identify one or more active devices installed on the first computing system;

identifying one or more legacy device type identifiers, included in the one or more active device type identifiers, that fail to correspond to one of a plurality of supported device type identifiers, the plurality of supported device type identifiers corresponding to a plurality of device types supported by the distributed management appliance;

including the one or more legacy device type identifiers and the plurality of supported device type identifiers in a customized support matrix; and distributing, by the distributed management appliance, the customized support matrix to each of the plurality of computing systems included in the distributed environment.

10. The information handling system of claim 9 wherein each of the plurality of computing systems corresponds to a computing system type, the processors performing additional actions comprising:

sending a firmware update request corresponding to the computing system type from the distributed management appliance to a vendor system;

receiving a firmware update package at the distributed management appliance in response to the firmware update request;

extracting the plurality of supported device type identifiers from the firmware update package; and storing the plurality of supported device type identifiers at the distributed management appliance.

11. The information handling system of claim 10 wherein the processors perform additional actions comprising:

sending, by the distributed management appliance, the customized support matrix to the vendor system;

sending a support request to the vendor system that includes one of the legacy device types; and receiving a support message from the vendor system in response to the vendor system determining that the included legacy device type is included in the customized support matrix.

12. The information handling system of claim 11 wherein the support request includes a customer identifier that corresponds to the distributed management appliance, the vendor system utilizing the customer identifier to select the customized support matrix from a plurality of customized support matrices located at the vendor system.

13. The information handling system of claim 12 wherein one of the plurality of customized support matrices located at the vendor system fails to include the one or more legacy device type identifiers.

14. The information handling system of claim 9 wherein the processors perform additional actions comprising:

receiving, at the distributed management appliance from a second one of the plurality of computing systems, one or more different active device type identifiers that identify one or more different devices installed in the second computing system;

identifying one or more different legacy device type identifiers, included in the one or more active device type identifiers, that fail to be included in the customized support matrix; and including the one or more different legacy device type identifiers in the customized support matrix prior to the distributing of the customized device support matrix.

15. The information handling system of claim 14 wherein the processors perform additional actions comprising:

detecting, at the second computer system, installation of a pluggable device;

determining, by the second computer system, that the installed pluggable device corresponds to one of the legacy device type identifiers included in the customized support matrix; and configuring, by the second computer system, the installed pluggable device in response to the determination.

16. The information handling system of claim 9 wherein, in response to the distribution, each of the plurality of computing systems included in the distributed environment is adapted to configure one or more legacy devices corresponding to the one more legacy device types.

17. A computer program product stored in a computer readable storage medium, comprising computer program code that, when executed by an information handling system, causes the information handling system to perform actions comprising:
   receiving, at a distributed management appliance from a first one of a plurality of computing systems included in a distributed environment, one or more active device type identifiers that identify one or more active devices installed on the first computing system;
   identifying one or more legacy device type identifiers, included in the one or more active device type identifiers, that fail to correspond to one of a plurality of supported device type identifiers, the plurality of supported device type identifiers corresponding to a plurality of device types supported by the distributed management appliance;
   including the one or more legacy device type identifiers and the plurality of supported device type identifiers in a customized support matrix; and
   distributing, by the distributed management appliance, the customized support matrix to each of the plurality of computing systems included in the distributed environment.

18. The computer program product of claim 17 wherein each of the plurality of computing systems corresponds to a computing system type, the information handling system performing additional actions comprising:
   sending a firmware update request corresponding to the computing system type from the distributed management appliance to a vendor system;
   receiving a firmware update package at the distributed management appliance in response to the firmware update request;
   extracting the plurality of supported device type identifiers from the firmware update package; and
   storing the plurality of supported device type identifiers at the distributed management appliance.

19. The computer program product of claim 18 wherein the information handling system performs additional actions comprising:
   sending, by the distributed management appliance, the customized support matrix to the vendor system;
   sending a support request to the vendor system that includes one of the legacy device types; and
   receiving a support message from the vendor system in response to the vendor system determining that the included legacy device type is included in the customized support matrix.

20. The computer program product of claim 19 wherein the support request includes a customer identifier that corresponds to the distributed management appliance, the vendor system utilizing the customer identifier to select the customized support matrix from a plurality of customized support matrices located at the vendor system.

21. The computer program product of claim 20 wherein one of the plurality of customized support matrices located at the vendor system fails to include the one or more legacy device type identifiers.

22. The computer program product of claim 21 wherein the information handling system performs additional actions comprising:
   receiving, at the distributed management appliance from a second one of the plurality of computing systems, one or more different active device type identifiers that identify one or more different devices installed in the second computing system;
   identifying one or more different legacy device type identifiers, included in the one or more active device type identifiers, that fail to be included in the customized support matrix; and
   including the one or more different legacy device type identifiers in the customized support matrix prior to the distributing of the customized device support matrix.

23. The computer program product of claim 17 wherein the information handling system performs additional actions comprising:
   detecting, at the second computer system, installation of a pluggable device;
   determining, by the second computer system, that the installed pluggable device corresponds to one of the legacy device type identifiers included in the customized support matrix; and
   configuring, by the second computer system, the installed pluggable device in response to the determination.

24. A method comprising:
   sending a firmware update request, corresponding to a computing system type, from a distributed management appliance to a vendor system, the distributed management appliance managing a plurality of computing systems corresponding to the computing system type within a distributed environment;
   receiving a firmware update package at the distributed management appliance in response to the firmware update request from the vendor system;
   extracting a plurality of supported device type identifiers from the firmware update package, the plurality of supported device type identifiers corresponding to a plurality of device types supported by the vendor system;
   receiving, at the distributed management appliance from a first one of a plurality of computing systems included in a distributed environment, one or more active device type identifiers that identify one or more active devices installed on the first computing system;
   identifying one or more legacy device type identifiers, included in the one or more active device type identifiers, that fail to correspond to one of the plurality of supported device type identifiers;
   including the one or more legacy device type identifiers and the plurality of supported device type identifiers in a customized support matrix; and
   distributing, by the distributed management appliance, the customized support matrix to each of the plurality of computing systems included in the distributed environment.

* * * * *